UNITED STATES PATENT OFFICE 2,143,008

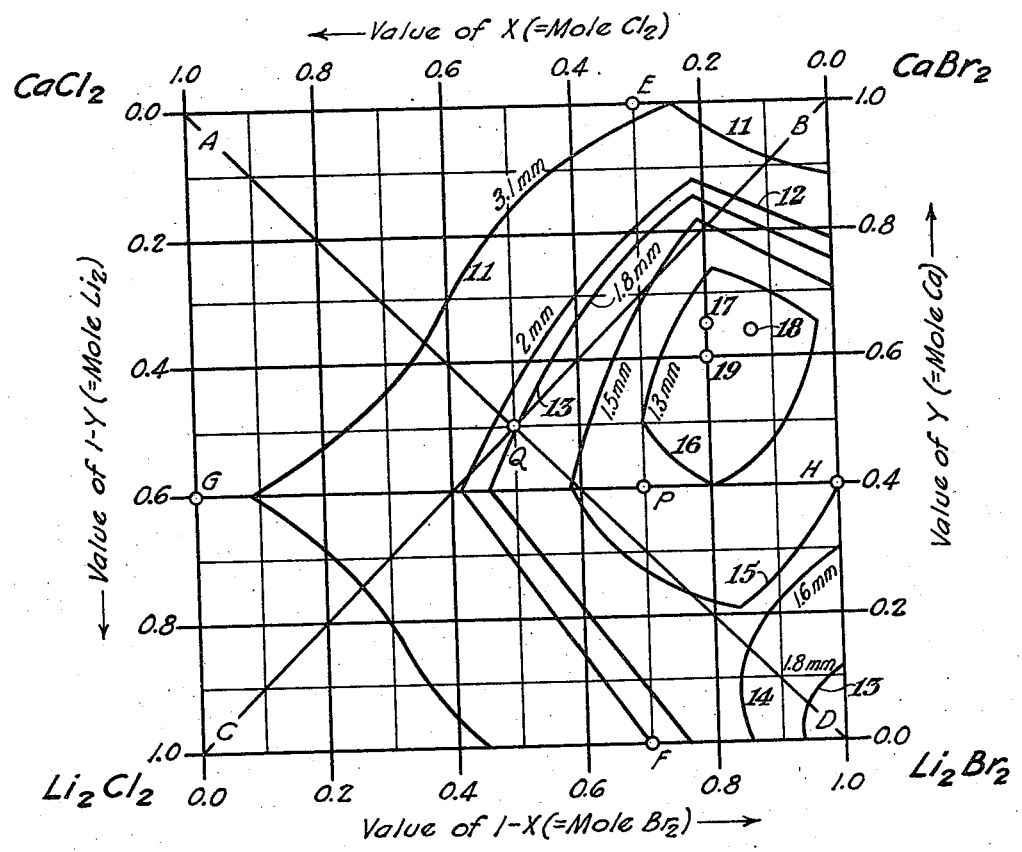

COMPOSITION FOR DEHUMIDIFYING GASES

Sheldon B. Heath and Forest R. Minger, Midland, Mich., assignors to The Dow Chemical Company, Midland, Mich., a corporation of Michigan Application May 29, 1936, Serial No. 82,544

3 Claims. (Cl. 252—2.5)

The invention relates to aqueous solutions of salts suitable for dehumidifying air and other gases; and particularly to a solution for use in air-conditioning apparatus in which use the solution is to be reconcentrated after having been diluted by absorption of moisture during use.

In a dehumidifying system employing an aqueous salt solution to absorb moisture from a gas, the solution is continuously diluted during use by the absorption of moisture from the gas, the absorbed water being removed by withdrawing a portion of the solution from the dehumidifier and subjecting it to evaporation. The so reconcentrated solution is then returned to the dehumidifier, usually in counter-current heat exchange relation to the main body of the solution therein. During use heat is continuously added to the solution in the dehumidifier in amount which depends upon: (a) the quantity of water absorbed from the gas treated, due to the liberation of the latent heat of condensation thereof, (b) the heat of dilution of the solution by such water, and (c) where a heat exchanger is employed, the quantity of sensible heat brought in with the reconcentrated solution, due to the inefficiency of the heat exchanger. The temperature of the dehumidifying solution on the one hand is thus raised by the aforementioned heating effects, while the gas contacted with the solution is likewise heated in turn to substantially the same temperature, and on the other hand the solution loses heat in direct proportion to the amount of heat taken up by the gas in contact with it. The net result is that the temperature of the solution increases over that of the inlet gas temperature up to the point at which a balance is reached between the quantity of sensible heat picked up by the gas in its passage through the dehumidifier and the heat produced in the solution by the several effects aforementioned.

The temperature to which the dehumidifying solution will be raised in use, then, may be calculated from the knowledge of the amount of water to be removed from the gas; the initial temperature, water content, and specific heat of the gas; the heat of dilution of the solution; and the quantity of sensible heat added to or removed from the solution by the returned reconcentrated solution. Thus when the initial gas temperature, its specific heat, and its water content are known and the amount of water to be removed has been fixed by the needs of the particular case in hand, whether or not an aqueous solution can be used to dehumidify the gas can be determined from a knowledge of its vapor pressure at the temperature to which it is calculated to rise in use, since at this temperature the solution must have a lower vapor pressure than that of the moisture in the gas at the same temperature in order to be able to absorb water therefrom. In fact, we have found that in order to make economical and practical use of an aqueous solution for the purpose, without employing an excessively large contact surface, it is necessary that the vapor pressure of the solution be from 1 to 2 mm. below that of the water in the gas at the temperature to which the solution will rise in use.

Such calculations enable one to determine whether an aqueous solution is capable of being so used in a particular case, or whether an excessively large area of contact between the solution and the gas must be employed, such as when the vapor pressure of the solution is nearly the same as that of the moisture in the gas. It is generally necessary in practice to supply cooling means within the dehumidifying solution to remove heat generated therein, so as to keep the vapor pressure of the solution low enough to maintain its effectiveness for dehumidification. However, we have found that it is generally not practical to attempt to remove all such heat from the dehumidifying solution, because the rate of heat transfer from the solution to a cooling surface is very small and an excessively large cooling surface is required to be effective. There is always also a risk of causing solid salts to crystallize upon the cooling surface, which would reduce its effectiveness.

One of the elements of the problem of dehumidifying gas by means of an aqueous solution, therefore, consists in providing a solution, the vapor pressure of which is not only considerably lower than that of the water in the gas to be dehumidified at the operating temperature of the solution, but also one which does not require much or any cooling to maintain its vapor pressure at a usefully low value.

Another difficulty that arises in attempting to employ aqueous solutions for dehumidification is caused by the necessity to reconcentrate and return a portion of such solution to the dehumidifier to compensate for the water absorbed by the main body of the solution. In reconcentrating such solutions and then cooling the same as nearly as possible to the dehumidifier solution temperature before returning to the dehumidifier, solutions hitherto available may become saturated and deposit solid salts, which interfere with the proper operation of the exchanger. Thus, another element in the problem of providing an aqueous solution for dehumidifying a gas involves creating a solution which is capable of being reconcentrated to a relatively low water content and cooled to approximately the dehumidifier operating temperature without reaching the saturation point.

Heretofore it has been proposed to employ a solution of a hygroscopic salt, such as calcium chloride, lithium chloride, or calcium bromide, for dehumidification. Lithium bromide has also been proposed, the saturated solution of which has a lower vapor pressure than any of the foregoing solutions at like temperature. Dehumidification with saturated solutions is not feasible, however, owing to dilution of the solution by water absorbed during use. Moreover, for many purposes it is desirable to dehumidify air and the like to a lower dew point than is obtainable with even a saturated solution of lithium bromide. For such purposes no suitable solutions are commercially available.

Accordingly, it is an object of the invention to provide an aqueous solution suitable for dehumidifying a gas, which solution in unsaturated condition possesses a lower vapor pressure than a saturated lithium bromide solution at corresponding temperatures. Other objects and advantages will appear as the description proceeds.

Our invention is predicated upon the discovery that aqueous solutions containing the bromides of both calcium and lithium in certain proportions exhibit lower vapor pressures than a saturated solution of lithium bromide alone at a corresponding temperature in the range ordinarily encountered in dehumidifying air and like gases. In certain instances, the solution may contain chlorides, such as calcium or lithium chloride, which further lowers the vapor pressure. More specifically, our solution comprises the cations calcium and lithium and the anion bromine, with or without the anion chlorine. The effective proportion of cation to anion in the solution will be better understood when considered in connection with the accompanying drawing, in which:

The single figure is a square diagram representing proportions of the ions in the solutions as well as the proportions of the salts from which these solutions may be made, plotted according to the method of Jänecke (Zeit. physikal. Chem., 1908, vol. 51, page 132; 1911, vol. 71 page 1).

In the figure the four corners of the diagram represent the anhydrous salts calcium chloride, calcium bromide, lithium chloride, and lithium bromide, those with a common ion being placed at adjacent corners of the square. Thus, the corner A represents one mole of calcium chloride expressed as $CaCl_2$ (110.99 grams); B one mole of calcium bromide expressed as $CaBr_2$ (199.9 grams); C one mole equivalent of lithium chloride expressed as $Li_2Cl_2$ (84.8 grams); and D one mole equivalent of lithium bromide expressed as $Li_2Br_2$ (173.7 grams).

The following description will illustrate the method of reading the diagram. The side AB of the square represents all molar proportions of calcium chloride and calcium bromide. Similarly, the side CD represents all proportions of lithium chloride and lithium bromide, the side AC represents all proportions of calcium chloride and lithium chloride, and the side BD represents all proportions of calcium bromide and lithium bromide. Then, a point, e. g., E, which is selected for illustration, on the side AB represents a solute composition containing 0.3 mole of calcium chloride and 0.7 mole of calcium bromide. Similarly, the point F on the side CD represents a solute containing 0.3 and 0.7 mole of lithium chloride and lithium bromide, respectively. Points E and F, therefore, represent two solutes in each of which the ratio of the mole equivalents of chlorine ($Cl_2$) to that of bromine ($Br_2$) is as 0.3 is to 0.7, and the line joining E and F likewise represents solute compositions in all of which chlorine and bromine are present in this same ratio. Expressed in general terms, the position of E relative to B and A and that of F relative to D and C is such as to divide the sides AB and CD in the ratio of X to 1—X, where X is the equivalent mole fraction of chlorine in the solute and, therefore, 1—X is the equivalent mole fraction of bromine in the solute. Similarly, the points G and H, for example, a distance Y from C and D, respectively, where Y is the equivalent mole fraction of calcium in the solute, give two solute compositions in each of which the ratio of calcium (Ca) to lithium ($Li_2$) is as Y is to 1—Y. The line joining G and H represents the composition of solutes in all of which calcium and lithium are present in this same ratio. For the particular points, G and H, selected for illustration, this ratio is 0.4 to 0.6. The point P in which the two lines EF and GH intersect, then, represents the composition of a solute which contains X mole equivalents of chlorine ($Cl_2$), i. e., 0.3, 1—X mole equivalents of bromine ($Br_2$), i. e., 0.7, Y mole equivalents of calcium (Ca), i. e., 0.4 and 1—Y mol equivalents of lithium ($Li_2$), i. e., 0.6. Thus all solute compositions exhibited by the diagram can be defined when the value of both X and Y is given.

The composition represented by any point within the square may be expressed in terms of the equivalent mole fractions of the various salts instead of the several ions. For this purpose, it is convenient to make reference to the diagonal lines AD and BC which intersect at Q. Points in the area enclosed by the triangle ABC represent solutions, the composition of which can be expressed in terms of calcium chloride, calcium bromide, and lithium chloride; those in the area by the triangle ABD can be expressed in terms of calcium chloride, calcium bromide, and lithium bromide; those in the area by the triangle BDC can be expressed in terms of calcium bromide, lithium bromide, and lithium chloride; those in the area enclosed by the triangle DCA can be expressed in terms of lithium bromide, lithium chloride, and calcium chloride. Thus composition of the solutions which lie in the area ABQ, which is common to the two triangles ABC and ABD, can be expressed in terms of calcium chloride, calcium bromide and either the chloride or bromide of lithium; also those which lie in the area BDQ can be expressed in terms of calcium bromide, lithium bromide, and the chloride of either calcium or lithium. Similarly, the composition of solutions in the areas DCQ and CAQ can be expressed in terms of either of the two ups of the three salts at the corners of the angles to which said areas are common. As illustration, the composition represented by e point P may be expressed in mole equivalent rms of either of the two groups of three salts the corners of the triangles ABD and BDC at include the point in their areas, viz., $CaCl_2$ 3 mole, $CaBr_2$ 0.1 mole, and $Li_2Br_2$ 0.6 mole, $CaBr_2$ 0.4 mole, $Li_2Br_2$ 0.3 mole, and $Li_2Cl_2$ 3 mole. Solute compositions lying on the diagonal line AD may be formed from the salt-pair calcium chloride and lithium bromide and those n the line joining B and C may be made from s reciprocal salt-pair calcium bromide and thium chloride since these salts are at the ends f the diagonals. The solute composition represented by Q, the point of intersection of the diagonals, therefore, can be expressed in terms f either reciprocal salt-pair.

The amount of water in which the solute will dissolve is not shown on the diagram. For convenience, the diagram may be regarded as representing the composition of solutions, since it shows he solute or salt mixture composition of which he solutions can be made. In any case, a point within the square ABCD represents one mole equivalent of solute or the composition of a solution or solute containing the four ions calcium, lithium, bromine, and chlorine in certain relative mole equivalent proportions which are determined by the perpendicular distance of the point from the sides of the diagram, and a point on a side of the square represents one mole equivalent of a solute or salt mixture containing the ions of the salts at the corners.

Again referring to the diagram to illustrate the invention, the curved lines 11, 12, 13, 14, 15, and 16 are isobars, that is, lines traced by a point representing solute compositions of solutions, saturated at 90° F., all of which on the same curve we have found to have substantially the same vapor pressure. The saturated solutions whose solute composition lies on isobar 11 have a vapor pressure of 3.1 mm., those on 12, 2 mm., on 13, 1.8 mm., on 14, 1.6 mm., on 15, 1.5 mm., and on 16, 1.3 mm. The vapor pressure of the saturated solutions at 90° F. of the individual salts, $CaCl_2$, $CaBr_2$, $Li_2Br_2$, and $Li_2Cl_2$, are 8 mm., 5.4 mm., 2.1 mm., and 4.1 mm., respectively. Thus we have found that certain solution compositions containing the ion equivalents Ca, $Li_2$, and $Br_2$, and in certain instances also $Cl_2$, have a lower vapor pressure than saturated solutions of the individual salts of which the solutions are made at a corresponding temperature. In particular, we have found the proportions of the salts which, when dissolved in water, yield solutions having a lower vapor pressure than a saturated solution of lithium bromide at like temperature. Saturated solutions of solute compositions inside the area enclosed by the isobar 12 and the portion of the sides of the diagram intersected by its ends, having a vapor pressure of 2 mm. or less at 90° F., all possess a lower vapor pressure than that of a saturated lithium bromide solution at 90° F. The solute compositions in the area between the two 1.8 mm. isobaric lines 13 and the portions of the sides of the diagram intersected by the ends all produce solutions having a substantially lower vapor pressure than that of saturated lithium bromide solution at the same temperature.

Further inspection of the diagram shows that solutions prepared from a mixture of calcium bromide and lithium bromide in certain proportions have lower vapor pressures than a saturated lithium bromide solution. For example, when the proportions of $CaBr_2$ are from 0.12 to 0.76 mole and $Li_2Br_2$ from 0.88 to 0.24 mole the vapor pressure of the solution is 1.8 mm. or less compared to 2.1 mm. for saturated lithium bromide solution at 90° F. Between 0.40 to 0.72 mole of $CaBr_2$ and 0.60 to 0.28 mole of $Li_2Br_2$, the vapor pressure of the solution is 1.5 mm. or less.

As already indicated, certain solute compositions inside the diagram give solutions having a lower vapor pressure than is obtainable with a mixture of calcium bromide and lithium bromide even in their optimum proportions, which is about 0.65 mole $CaBr_2$ to 0.35 mole of $Li_2Br_2$ at 90° F. when saturated, the last mentioned solution having a vapor pressure of 1.4 mm. For example, by adding either calcium chloride or lithium chloride or both to a solution containing both calcium bromide and lithium bromide solutions are obtained, the vapor pressures of which are lower than that of a correspondingly saturated solution of lithium bromide at like temperature. As illustrative of this, we have found that for solute composition of which X has a value between 0 and 0.35 and Y a value between 0.06 and 0.76, the solutions possess substantially lower vapor pressures at 90° F. than that of lithium bromide solution saturated at the same temperature, since such solutions lie within the isobar 12. More advantageous solute proportions are those in which X has a value between 0.03 and 0.3 and Y a value between 0.4 and 0.74. The vapor pressures of the saturated solutions of these solutes are generally less than about 1.5 mm. at 90° F. The preferred proportions of the four ion equivalents Ca, $Li_2$, $Cl_2$, and $Br_2$, to obtain the lowest vapor pressures, lie inside the isobar 16. The vapor pressure of the solutions, the solutes of which are indicated by points 17, 18, and 19 inside the isobar 16, are of special interest. Their vapor pressures are less than 1 mm. at 90° F. and will be further referred to hereinafter.

The position of the isobaric lines aforementioned, the points on which represent, as indicated, solute compositions the aqueous solutions of which saturated at the same temperature, have substantially the same vapor pressure, varies with the concentration of the solution, and the latter depends upon the temperature. Those shown on the drawing represent by way of illustration the solute composition for solutions saturated at 90° F., as aforesaid. Similar lines can be drawn for other temperatures.

The scope of the invention, therefore, is not limited by the drawing, but includes unsaturated aqueous solutions, the solute composition of which comprises the cations calcium and lithium, and the anion bromine, with or without the anion chloride, in proportions such that the vapor pressure of the solution will be lower than a correspondingly concentrated solution of lithium bromide at like temperatures.

Within such range of proportions certain unique solute compositions have been discovered, the aqueous solutions of which exhibit the lowest vapor pressure of any stable solutions containing the four ion equivalents Ca, $Li_2$, $Br_2$, and $Cl_2$. These are "drying-up" compositions, that is, saturated solutions in which the relative proportions of the four ion equivalents do not substantially change by differential crystallization when water is removed therefrom by isothermal evaporation at the temperature of saturation. It is characteristic of these solutions that when at equilibrium with salt crystals three or more solid salt phases are present. Referring to the drawing, examples of the composition of the solute of saturated solutions of this type at 90° F. are shown at points 17, 18, and 19 hereinbefore mentioned. The proportions of the ion equivalents and of the salts of which the solutes therefor may be made, the proportion of water which gives a saturated solution thereof, and their vapor pressures at 90° F. and at 100° F. are given in Table I.

ed to form a saturated solution and yet the resulting unsaturated solution will possess a lower vapor pressure than a correspondingly concentrated lithium bromide solution. Such solutions have the advantage that on being cooled after sufficiently concentrating for reuse, do not deposit solid salts which would clog the apparatus. The suitably diluted solutions may be used at lower temperatures, e. g., as low as 70° F. without

*Table I*

| Solution reference number in the drawing | Composition of solute in mole equivalents per mole of solute | | | | | | | | | | Moles of $H_2O$ to dissolve 1 mole equivalent of solute at 90° F. | Vapor pressure in mm. of Hg | |
|---|---|---|---|---|---|---|---|---|---|---|---|---|---|
| | Expressed in fractional ion equivalents | | | | Expressed in fractional mole equivalents of anhydrous salts | | | | | | | | |
| | | | | | From triangle ABD | | | From triangle BDC | | | | 90° F. | 100° F. |
| | Ca | $Li_2$ | $Br_2$ | $Cl_2$ | $CaCl_2$ | $CaBr_2$ | $Li_2Br_2$ | $CaBr_2$ | $Li_2Br_2$ | $Li_2Cl_2$ | | | |
| 17 | 0.65 | 0.35 | 0.80 | 0.20 | 0.20 | 0.45 | 0.35 | 0.65 | 0.15 | 0.20 | 3.82 | 0.97 | 1.38 |
| 18 | 0.64 | 0.36 | 0.87 | 0.13 | 0.13 | 0.51 | 0.36 | 0.64 | 0.23 | 0.13 | 3.87 | 0.98 | 1.4 |
| 19 | 0.60 | 0.40 | 0.80 | 0.20 | 0.20 | 0.40 | 0.40 | 0.60 | 0.20 | 0.20 | 3.55 | 0.98 | 1.4 |

In making the solutions coming within the scope of our invention, the anhydrous salts, salts containing water of crystallization, or mixtures thereof, may be used and water may be added or removed by evaporation to secure the desired proportion of water. Ordinary commercially pure salts may be used. Generally such salts contain a small amount of impurities consisting of soluble and insoluble salts. It is preferable to remove the latter by filtration or settling before using the solution. The proportion of water to be employed is based upon the solubility of the mixtures of the salts. We have found that the salt mixtures within the scope of our invention are more soluble than the individual salts from which the solutions may be prepared. This property is highly advantageous because it permits making up solutions having not only a relatively low vapor pressure, but also a relatively low crystallization temperature. For example, solutes derived from the corresponding calcium and lithium halide on and within the boundaries of the diagram for which $1-X$ (equivalent mole fraction of $Br_2$ in the solute) has a value between 1 and 0.6 while Y (equivalent mole fraction of Ca in the solute) has a value between 0.06 and 0.76 all possess greater solubilities in saturated solution than the individual salts and their saturated and unsaturated solutions possess exceptionally low vapor pressures.

Such solute mixtures so greatly lower the vapor pressure of water that they may be used in more dilute solutions than corresponds to saturation. For example, the salt mixtures giving a drying-up composition, when saturated, may be dissolved in considerably more water than needed to form a saturated solution and yet the resulting unsaturated solution will possess a lower vapor pressure than a correspondingly concentrated lithium bromide solution. Such solutions have the advantage that on being cooled after sufficiently concentrating for reuse, do not deposit solid salts which would clog the apparatus. The suitably diluted solutions may be used at lower temperatures, e. g., as low as 70° F. without crystallization, thereby having the advantage that precipitation of salt crystals from the solution does not occur when, for instance, the dehumidifying apparatus is shut down and the solution is allowed to cool below the usual operating temperature.

The effect of dilution as well as temperature on the vapor pressure is illustrated in the following data (Table II) for a solute composition of which X has a value of about 0.2 and Y about 0.65, i. e., point 17 in the diagram. In the table is given the proportion of water to solute, the temperature at which salt crystals begin to crystallize out of the solution, i. e., the crystallizing temperature, and the vapor pressure at various temperatures. The vapor pressure at corresponding temperatures of a lithium bromide solution saturated at 90° F. is given for comparison.

*Table II*

| Moles of $H_2O$ per mole of solute | Crystallizing temperature, °F. | Vapor pressure in mm. of Hg at various temperatures, ° F. | | | | | | | |
|---|---|---|---|---|---|---|---|---|---|
| | | 70° | 80° | 90° | 100° | 110° | 120° | 130° | 140° |
| 3.82 | 90 | | | 0.98 | 1.38 | 2.0 | 2.9 | 4.0 | 5.5 |
| 3.845 | 80 | | 0.68 | 1.04 | 1.52 | 2.2 | 3.06 | 4.4 | 6.2 |
| 3.90 | 70 | 0.50 | 0.77 | 1.2 | 1.75 | 2.5 | 3.55 | 5.1 | 7.0 |
| 4.07 | 64 | 0.86 | 1.18 | 1.8 | 2.6 | 3.8 | 5.2 | 7.0 | 9.8 |
| 4.29 | 58 | 1.35 | 2.0 | 2.85 | 3.95 | 5.74 | 7.88 | 10.8 | 14.8 |
| 4.68 | 53 | 2.6 | 3.8 | 5.4 | 7.6 | 10.4 | 14.2 | 19.2 | 26.2 |
| Moles of $H_2O$ per mole of $Li_2Br_2$, 4.98 | 90 | | | 2.1 | 3.0 | 4.1 | 6.0 | 8.0 | 11.3 |

Our dehumidifying solutions may contain in addition to the foregoing salt mixtures, a minor proportion of other water soluble salts without materially increasing the vapor pressure of the solutions. In some cases the addition of other such salts has the advantage of further lowering the vapor pressure of the solution. For example, the addition of cadmium iodide, magnesium nitrate, and zinc bromide or chloride to the aqueous solution containing calcium, lithium, and bromine ions saturated at 90° F. and having a vapor pressure of 1.4 mm. can reduce the vapor pressure to between 0.98 mm. and 0.85 mm. at 90° F. The addition of bromide and iodide of potassium to the solution containing calcium, lithium, bromine, and chlorine ions, saturated at 90° F., reduces the vapor pressure as much as 0.4 mm. at 90° F.

While we have set forth a number of solute compositions as illustrative examples in which the solute consists essentially of calcium and lithium in combination with bromine, or both chlorine and bromine, it is to be understood that the invention is not limited by such illustrations nor it is limited to solutes consisting exclusively of the salts set forth, since the solute may comprise calcium bromide in combination with lithium bromide in the proportions given together with another salt or salts, as hereinbefore described, without departing from the invention.

Our new solutions have various advantages over those hitherto available for gas and air conditioning. For example, the solution having a solute composition represented by the point 17 in the diagram, when saturated at 70° F., has the same dehumidifying power, even at a temperature of 121° F. as ice at 32° F., provide the area of contact of the ice and the gas is the same as that of the solution. Furthermore, the solutions can be used at much higher temperatures than heretofore to dehumidify air and the like to a very much lower dew point than is possible with available solutions operating at lower temperatures, for which additional cooling is necessary. As a consequence a relatively small area of contact between our improved solutions and the gas is effective to bring about dehumidification, a relatively small volume of gas need be circulated in removing a relatively large moisture and sensible heat load from a building or the like, and the solution need not be artificially cooled.

This application is a continuation-in-part of our co-pending application Serial No. 743,348, filed September 10, 1934.

Other modes of applying the principle of our invention may be employed instead of those explained, change being made as regards the materials and method herein disclosed, provided the ingredients stated by any of the following claims or the equivalent of such stated ingredients be employed.

We therefore particularly point out and distinctly claim as our invention:

1. A composition of matter comprising an aqueous solution having a substantial concentration of calcium bromide and lithium bromide sufficient to be effective for dehumidifying gases, such solution containing the said salts in the relative proportions of from 0.2 to 0.76 mole equivalent of $CaBr_2$ and from 0.8 to 0.24 mole equivalent of $Li_2Br_2$.

2. A composition of matter comprising an aqueous solution having a substantial concentration of calcium bromide and lithium bromide sufficient to be effective for dehumidifying gases, such solution containing the said salts in the relative proportions of from 0.4 to 0.72 mole equivalent of $CaBr_2$ and from 0.60 to 0.28 mole equivalent of $Li_2Br_2$.

3. A composition of matter comprising an aqueous solution containing in relative equivalent mole proportions $1-X$ mole of $Br_2$, $Y$ mole of Ca, $1-Y$ mole of $Li_2$ derived from the corresponding bromides and chlorides of calcium and lithium, in which proportions $1-X$ has a value between 1 and 0.58, $Y$ has a value between 0.2 and 0.82, said solution having a substantial concentration sufficient to be effective for dehumidifying gases, and when saturated at 90° F. having a vapor pressure not in excess of 1.5 millimeters.

SHELDON B. HEATH.
FOREST R. MINGER.